United States Patent
Arai et al.

(10) Patent No.: US 12,046,395 B2
(45) Date of Patent: Jul. 23, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kenta Arai, Mie (JP); Ryusuke Kudo, Mie (JP); Masaki Mizushita, Mie (JP); Tetsuya Nishimura, Mie (JP); Haruka Nakano, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 217 days.

(21) Appl. No.: 17/638,527

(22) PCT Filed: Sep. 11, 2020

(86) PCT No.: PCT/JP2020/034467
§ 371 (c)(1),
(2) Date: Feb. 25, 2022

(87) PCT Pub. No.: WO2021/049615
PCT Pub. Date: Mar. 18, 2021

(65) Prior Publication Data
US 2022/0293297 A1 Sep. 15, 2022

(30) Foreign Application Priority Data
Sep. 13, 2019 (JP) ................................ 2019-167251

(51) Int. Cl.
*H01B 7/08* (2006.01)
*H02G 3/04* (2006.01)

(52) U.S. Cl.
CPC ............. *H01B 7/0838* (2013.01); *H02G 3/04* (2013.01)

(58) Field of Classification Search
CPC .......... H01B 7/0838; H01B 7/08; H02G 3/04; B60R 16/0207; B60R 16/0215
See application file for complete search history.

(56) References Cited

U.S. PATENT DOCUMENTS

2008/0205059 A1 8/2008 Tsuji et al.
2014/0144698 A1 5/2014 Sato et al.
(Continued)

FOREIGN PATENT DOCUMENTS

CN 101255970 9/2008
CN 104009424 8/2014
(Continued)

OTHER PUBLICATIONS

China Office Action issued in China Patent Application No. 202080063062.0, dated Aug. 16, 2023, together with English translation thereof.
(Continued)

*Primary Examiner* — Timothy J Thompson
*Assistant Examiner* — Amol H Patel
(74) *Attorney, Agent, or Firm* — GREENBLUM & BERNSTEIN P.L.C.

(57) ABSTRACT

A wiring member includes: a base member including a base sheet member and a cover sheet member; and a wire-like transmission member fixed to the base member, wherein the cover sheet member is overlapped with the base sheet member while covering the wire-like transmission member, a side part of the base sheet member and a side part of the
(Continued)

cover sheet member are joined via a joint part, and an edge of at least one of the base sheet member and the cover sheet member is located on an outer side of the joint part.

9 Claims, 7 Drawing Sheets

(56) References Cited

U.S. PATENT DOCUMENTS

| | | | |
|---|---|---|---|
| 2015/0321625 A1* | 11/2015 | Sato | B60R 16/0215 174/72 A |
| 2020/0141518 A1 | 5/2020 | Nakano et al. | |

FOREIGN PATENT DOCUMENTS

| | | |
|---|---|---|
| CN | 104868338 | 8/2015 |
| JP | 2-12713 | 1/1990 |
| JP | 5-314833 | 11/1993 |
| JP | 2014-87191 | 5/2014 |
| JP | 2016-81823 | 5/2016 |
| JP | 2017-174685 | 9/2017 |
| JP | 2019-004679 | 1/2019 |
| WO | 2014/038259 | 3/2014 |
| WO | 2014/050196 | 4/2014 |

OTHER PUBLICATIONS

International Search Report issued International Patent Application No. PCT/JP2020/034467, dated Oct. 27, 2020, along with an English translation thereof.
International Preliminary Report on Patentability issued International Patent Application No. PCT/JP2020/034467, dated Mar. 24, 2022, along with an English translation thereof.
Japan Office Action issued in Japan Patent Application No. 2019-167251, dated Aug. 23, 2022, together with English translation thereof.
Japan Office Action issued in Japan Patent Application No. 2023-036222, dated Dec. 12, 2023, together with English translation thereof.

* cited by examiner

WIRING MEMBER

TECHNICAL FIELD

The present disclosure relates to a wiring member.

BACKGROUND ART

Patent Document 1 discloses a wire harness in which electrical wires are sandwiched between two sheet materials to be flatly formed as a whole. Patent Document 1 discloses that both side edge portions of the two sheet materials are fixed by welding, for example.

PRIOR ART DOCUMENTS

Patent Documents

Patent Document 1: Japanese Patent Application Laid-Open No. 2019-004679

SUMMARY

Problem to be Solved by the Invention

A protruding part caused by processing such as a burr is desired to be invisible in a wiring member.

Accordingly, an object of the present disclosure is to prevent an unnecessary protruding part caused by processing from being visible in a side part of the wiring member.

Means to Solve the Problem

A wiring member according to the present disclosure is a wiring member including: a base member including a base sheet member and a cover sheet member; and a wire-like transmission member fixed to the base member, wherein the cover sheet member is overlapped with the base sheet member while covering the wire-like transmission member, a side part of the base sheet member and a side part of the cover sheet member are joined via a joint part, and an edge of at least one of the base sheet member and the cover sheet member is located on an outer side of the joint part.

A wiring member according to the present disclosure is a wiring member including: a base member including a base sheet member and a cover sheet member; and a wire-like transmission member fixed to the base member, wherein the cover sheet member is overlapped with the base sheet member while covering the wire-like transmission member, a side part of the base sheet member and a side part of the cover sheet member are joined via an initial overlap joint part, a protruding part protruding from the initial overlap joint part toward outside is formed on one of the base sheet member and the cover sheet member, and the protruding part is joined to another one of the base sheet member and the cover sheet member in an inner side of an edge of the another one of the base sheet member and the cover sheet member.

Effects of the Invention

According to the present disclosure, a protruding part caused by processing is hardly visible in a side part of a wiring member.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a base member including a base sheet member and a cover sheet member; and a wire-like transmission member fixed to the base member, wherein the cover sheet member is overlapped with the base sheet member while covering the wire-like transmission member, a side part of the base sheet member and a side part of the cover sheet member are joined via a joint part, and an edge of at least one of the base sheet member and the cover sheet member is located on an outer side of the joint part. A protruding part protruding outside from the joint part occurs by processing for joint in some cases. In this case, even if the protruding part is formed to extend from the joint part, the protruding part is easily housed in the edge of at least one of the base sheet member and the cover sheet member.

(2) The edge of one of the base sheet member and the cover sheet member may be located on an outer side of the edge of another one of the base sheet member and the cover sheet member. Even if the protruding part protrudes more than the edge of the other one of the base sheet member and the cover sheet member, the protruding part is easily housed in the edge of one of the base sheet member and the cover sheet member. Thus, a protruding part caused by processing is hardly visible in a side part of a wiring member.

(3) The one of the base sheet member and the cover sheet member may be softer than the another one of the base sheet member and the cover sheet member. Herein, the edge of one of the base sheet member and the cover sheet member is located on the outer side of the edge of the other one of the base sheet member and the cover sheet member in the outer side of the joint part. Thus, the edge of the softer one is located on the outer side of the edge of the harder one, thus a soft texture can be provided when the wiring member is touched.

(4) The cover sheet member may be overlapped with a whole of the base sheet member in an extension direction of the base sheet member. In this case, the cover sheet member can protect the wire-like transmission member over the whole of the base sheet member in the extension direction.

(5) A protruding part occurring by joint processing may be formed to extend outside from the joint part. In this case, even if the protruding part occurring by the joint processing is formed to extend outside from the joint part, the protruding part is easily housed in the edge of one of the base sheet member and the cover sheet member. Thus, a protruding part caused by processing is hardly visible in a side part of a wiring member.

(6) The protruding part may be joined to at least one of the base sheet member and the cover sheet member. A joint area is increased, and joint strength is increased.

(7) It is applicable that the base member includes a concave side part concaved more than another part in a part of the side part, the joint part is formed to have a smaller width than another part in a part corresponding to the concave side part, and the edge of at least one of the base sheet member and the cover sheet member is located on an outer side of the joint part in the part corresponding to the concave side part. In this case, when the joint part is formed to have the small width in the part corresponding to the concave side part, the protruding part protruding outside from the joint part easily occurs. Such a protruding part is hardly visible.

(8) A wiring member includes: a base member including a base sheet member and a cover sheet member; and a wire-like transmission member fixed to the base member, wherein the cover sheet member is overlapped with the base sheet member while covering the wire-like transmission member, a side part of the base sheet member and a side part of the cover sheet member are joined via an initial overlap joint part, a protruding part protruding from the initial overlap joint part toward outside is formed on one of the base sheet member and the cover sheet member, and the protruding part is joined to another one of the base sheet member and the cover sheet member in an inner side of an edge of the another one of the base sheet member and the cover sheet member. Even if the protruding part is formed to extend from the initial overlap joint part, the protruding part is easily housed in the edge of at least one of the base sheet member and the cover sheet member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 1:
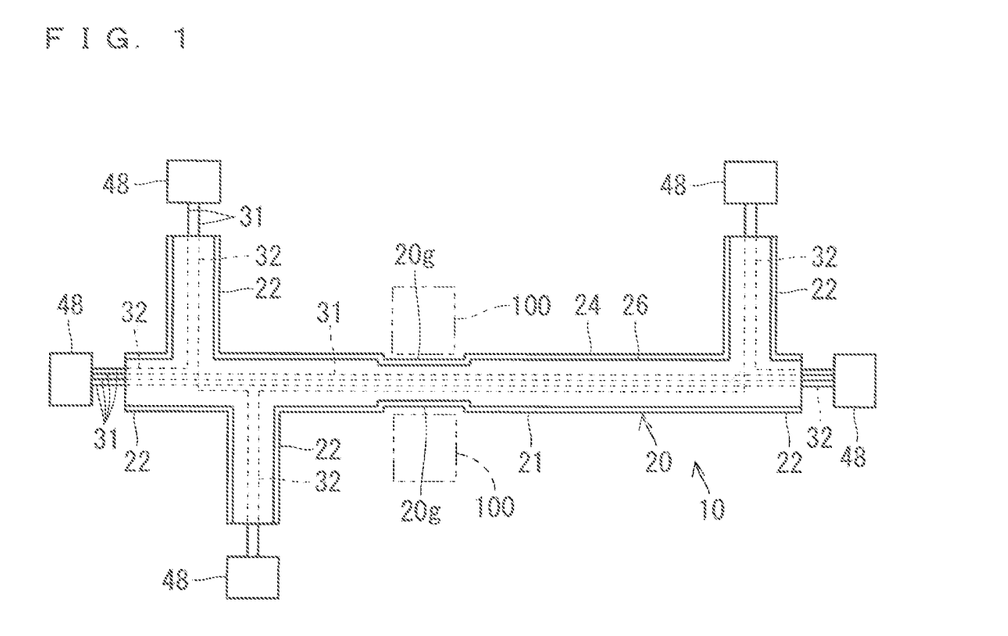
FIG. 1 is a plan view illustrating a wiring member according to an embodiment.
Figure 2:
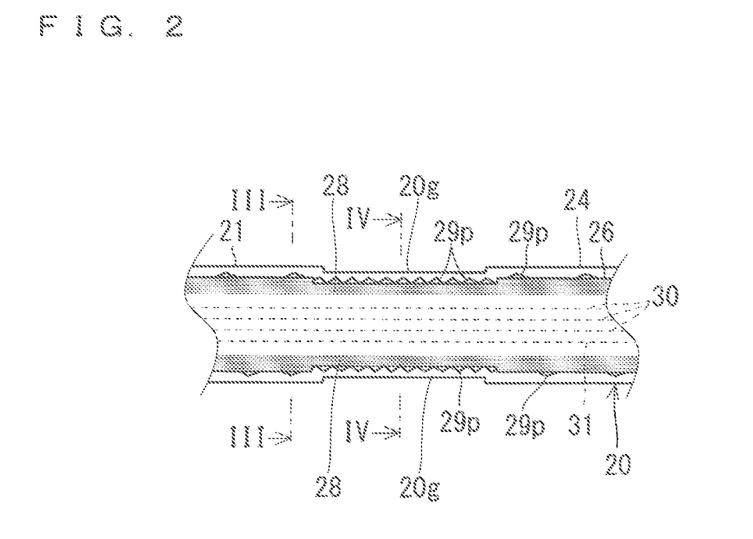
FIG. 2 is a partial plan view of FIG. 1.
Figure 3:
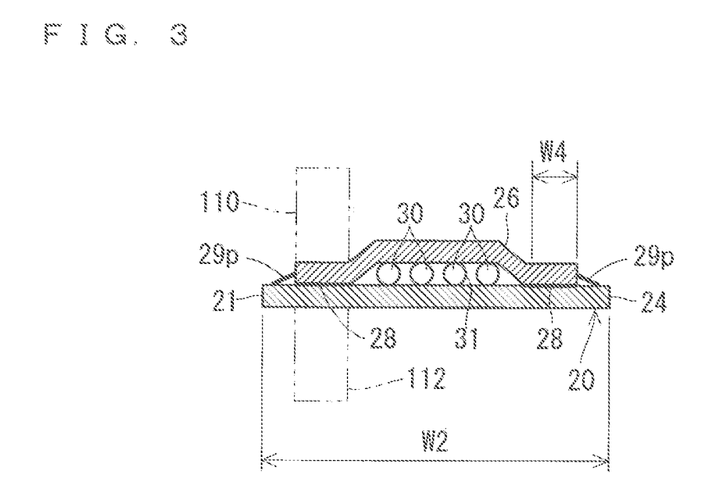
FIG. 3 is a cross sectional view along a III-III line in FIG. 2.
Figure 4:
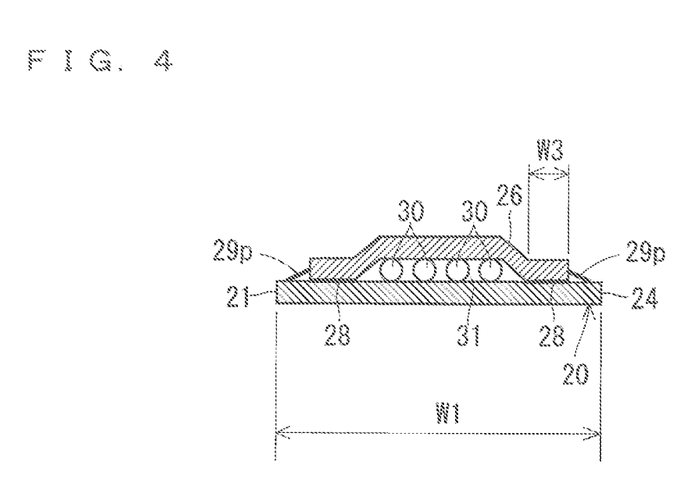
FIG. 4 is a cross-sectional view along a IV-IV line in FIG. 2.

A wiring member according to an embodiment is described hereinafter. FIG. 1 is a plan view illustrating a wiring member 10. FIG. 2 is a partial plan view of FIG. 1. FIG. 3 is a cross-sectional view along a III-III line in FIG. 2. FIG. 4 is a cross-sectional view along an IV-IV line in FIG. 2. The wiring member 10 includes a base member 20 and a plurality of wire-like transmission members 30.

The base member 20 includes a base sheet member 24 and a cover sheet member 26, and is formed into a flat shape as a whole. The plurality of wire-like transmission members 30 are wire-like members transmitting an electrical power or light, for example. The plurality of wire-like transmission members 30 are fixed to the base member 20, thus the wiring member 10 is kept in a flat state.

More specifically, the plurality of wire-like transmission members 30 are fixed to the base member 20 in a form that a branch wire part 32 branches from a main wire part 31. The main wire part 31 is a part where all or some of the plurality of wire-like transmission members 30 are collected so that the number of the wire-like transmission members 30 becomes the largest. The branch wire part 32 is a part where at least one wire-like transmission member 30 branches from an end portion or a middle portion in an extension direction of the main wire part 31. Herein, the plurality of branch wire parts 32 extend from the main wire part 31. A connector 48 is provided on an end portion of the branch wire part 32. This connector 48 is connected to the other side component, thus the wire-like transmission member 30 is connected to the other side component. That is to say, the present wiring member 10 is used as a wiring member electrically connecting various types of component in a vehicle, for example (or connecting them so that they can perform optical communication). The connector may be fixed to the base member 20.

The plurality of wire-like transmission members 30 are assumed to be wire-like transmission members connecting components in a vehicle. A branching position where the branch wire part 32 branches from the main wire part 31 and an extension direction of the branch wire part 32 are set in accordance with a position of a component which is a connection destination of the branch wire part 32. The plurality of wire-like transmission members 30 are fixed to the base member 20, thus the plurality of wire-like transmission members 30 are kept in a form following a wiring route corresponding to a position of a component as a connection destination of each wire-like transmission member 30.

More specifically, the wire-like transmission member 30 may be a wire-like member transmitting an electrical power or light, for example, as described above. For example, the wire-like transmission member 30 may be a general wire having a core wire and a covering around the core wire, or may also be a bare wire, a shielded wire, a twisted wire, an enamel wire, a nichrome wire, or an optical fiber.

The wire-like transmission member 30 transmitting the electrical power may be various kinds of signal lines or various kinds of power lines. Some of the wire-like transmission members transmitting the electrical power may be used as an antenna or coil, for example, transmitting or receiving a signal or electrical power to or from a space.

The wire-like transmission member 30 may be a single wire-like object or a composite object of a plurality of wire-like objects (a twisted wire and a cable made up of a plurality of wire-like objects covered by a sheath).

Description herein is based on an assumption that the wire-like transmission member 30 is an electrical wire.

The cover sheet member 26 is overlapped with the base sheet member 24 to constitute the base sheet member 24. The base sheet member 24 may be a resin sheet. For example, the base sheet member 24 may be formed of resin such as polyvinyl chloride (PVC), polyethylene (PE), polypropylene (PP), or polyethylene terephthalate (PET). The base sheet member 24 is also considered a non-woven cloth or a foamed sheet, for example. The base sheet member 24 may have a single layer structure, or may also have a multilayer structure. The base sheet member 24 may have a metal layer.

The cover sheet member 26 is wholly overlapped with the base sheet member 24. The cover sheet member 26 covers the wire-like transmission member 30 from a side opposite to the base sheet member 24. In other words, the plurality of wire-like transmission members 30 are provided between the base sheet member 24 and the cover sheet member 26.

The cover sheet member 26 may be a resin sheet. For example, the cover sheet member 26 may be formed by resin such as PVC, PE, PP, or PET in the manner similar to the base sheet member 24. One of the base sheet member 24 and the cover sheet member 26 may be softer than the other one. The softness herein, or rigidity conversely, may also be evaluated by Rockwell hardness, for example. In the description herein, the base sheet member 24 is softer than the cover sheet member 26. For example, it is applicable that the cover sheet member 26 is formed by a material such as nylon, PET, or PP, and the base sheet member 24 is a soft member made up of a sheet-like member formed by soft PVC and a non-woven cloth formed by PET stacked with each other.

The base member 20 includes a main wire fixing part 21 and a branch wire fixing part 22. Herein, the main wire fixing part 21 is formed into a band-like shape extending straight. The main wire fixing part 21 may be bended in a midway portion. The main wire part 31 of the plurality of wire-like transmission members 30 is fixed to the main wire fixing part 21. Herein, a fixing structure of the wire-like transmission member 30 fixed to the main wire fixing part 21 is not particularly limited as long as the wire-like transmission member 30 is kept in a form following the main wire fixing part 21. The branch wire fixing part 22 extends from an end portion or a middle portion in an extension direction of the main wire fixing part 21. Herein, the plurality of branch wire fixing parts 22 are provided. Each of the plurality of branch wire fixing parts 22 is formed into a quadrangular or an elongated band-like shape. The branch wire fixing part 22 may be bended in a midway portion. Herein, a fixing structure of the wire-like transmission member 30 fixed to the branch wire fixing part 22 is not particularly limited as long as the wire-like transmission member 30 is kept in a form following the branch wire fixing part 22.

The base sheet member 24 is formed into a shape in which the plurality of branch wire fixing parts 22 extend from the main wire fixing part 21. The cover sheet member 26 is also formed into a shape in which the plurality of branch wire fixing parts 22 extend from the main wire fixing part 21. The cover sheet member 26 is overlapped with the base sheet member 24 while covering the wire-like transmission member 30. That is to say, the wire-like transmission member 30 is fixed to the base member 20 in a state where the wire-like transmission member 30 is disposed between the base sheet member 24 and the cover sheet member 26.

Herein, a fixing structure of the wire-like transmission member 30 fixed to the base member 20 is not particularly limited as long as the wire-like transmission member 30 is fixed to the base member 20.

For example, the wire-like transmission member 30 is fixed to the base sheet member 24. Applicable as the fixing state are a contact area fixation and a non-contact area fixation, or both fixations may be used together. Herein, the contact area fixation indicates that a portion where the wire-like transmission member 30 and the base sheet member 24 have contact with each other is stuck and fixed. The non-contact area fixation indicates the fixing state which is not the contact area fixation. For example, a sewing thread, the cover sheet member 26, or an adhesive tape presses the wire-like transmission member 30 toward the base sheet member 24, or a sewing thread, the cover sheet member 26, or an adhesive tape sandwiches the wire-like transmission member 30 and the base sheet member 24, thereby keeping the state. In the description hereinafter, the wire-like transmission member 30 and the base sheet member 24 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 30 and the base sheet member 24 are indirectly stuck and fixed via an adhesive agent, a gluing agent, and a double-sided adhesive tape provided therebetween. The contact area direct fixation indicates that the wire-like transmission member 30 and the base sheet member 24 are directly stuck and fixed without an intervention of the adhesive agent, for example, which is separately provided. Considered in the contact area direct fixation is that resin included in at least one of the wire-like transmission member 30 and the base sheet member 24 is melted, thus the wire-like transmission member 30 and the base sheet member 24 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the wire-like transmission member 30 and the base sheet member 24 are in the state of the contact area direct fixation by these means. Specifically, when the state of the contact area direct fixation is formed by the ultrasonic welding, for example, the wire-like transmission member 30 and the base sheet member 24 are in the state of the contact area direct fixation by the ultrasonic welding.

In the description hereinafter, the wire-like transmission member 30 and the base sheet member 24 are in the state of the contact area direct fixation. The wire-like transmission member 30 needs not be fixed to the base sheet member 24 in the same form in both the main wire fixing part 21 and the branch wire fixing part 22. It is also applicable that the wire-like transmission member 30 is fixed in the form of the contact area direct fixation by welding, for example, in the main wire fixing part 21, and the wire-like transmission member 30 is sandwiched between the base sheet member 24 and the cover sheet member 26 and fixed in the branch wire fixing part 22.

A side part of at least part of the cover sheet member 26 is joined to a side part of the base sheet member 24 via a joint part 28. Herein, the cover sheet member 26 is overlapped with the whole base sheet member 24 in the extension direction in the main wire fixing part 21. In the main wire fixing part 21, both side parts of the whole cover sheet member 26 in the extension direction is joined to both side parts of the whole base sheet member 24 in the extension direction via the joint part 28. The cover sheet member 26 is overlapped with the whole base sheet member 24 in the extension direction in each branch wire fixing part 22. In each branch wire fixing part 22, the both side parts of the whole cover sheet member 26 in the extension direction is joined to the both side parts of the whole base sheet member 24 in the extension direction via the joint part 28.

Described in the present embodiment is an example that the cover sheet member 26 is overlapped with the whole base sheet member 24 in the extension direction of the base sheet member 24. The cover sheet member 26 needs not be overlapped with the whole base sheet member 24. It is applicable that the cover sheet member 26 is not overlapped with the base sheet member 24 but the wire-like transmission member 30 is exposed in a middle portion of the main wire fixing part 21 and the branch wire fixing part 22 in the extension direction and the end portion of the branch wire fixing part 22, for example. The side part of the cover sheet member 26 needs not be joined to the base sheet member 24 in a whole region where the cover sheet member 26 is overlapped with the whole base sheet member 24.

The joint part 28 is a part joined by a joint method having a possibility that a protruding part 29p protruding outside occurs when the base sheet member 24 and the cover sheet member 26 are joined. The joint part 28 is joined by welding or adhesion, for example. The welding may be ultrasonic welding or thermal welding. When the base sheet member 24 and the cover sheet member 26 in a pressurized state are welded, a melted part of at least one of the base sheet member 24 and the cover sheet member 26 becomes the protruding part 29p (a so-called burr) and is formed to protrude outside from the joint part 28. When the base sheet member 24 and the cover sheet member 26 are joined by an adhesive agent, for example, there is a possibility that the adhesive agent protrudes from between the base sheet member 24 and the cover sheet member 26 to become the protruding part 29p, and is formed to protrude outside from the joint part 28. FIG. 3 illustrates that the side part of the base sheet member 24 and the side part of the cover sheet member 26 are sandwiched between a chip 110 and an anvil 112 for applying ultrasonic energy and ultrasonic welding is performed thereon.

In the present embodiment, the joint part 28 joins the side part of the base sheet member 24 and the side part of the cover sheet member 26. In other words, the joint part 28 is a part bonding the side part of the base sheet member 24 and the side part of the cover sheet member 26 to prevent them from being separated from each other in a part where the side part of the base sheet member 24 and the side part of the cover sheet member 26 are overlapped with each other.

The joint part 28 may be continuously or intermittently formed along the side part of the base member 20. The edge of at least one of the base sheet member 24 and the cover sheet member 26 described above is located on an outer side of the joint part 28. Herein, the case where the edge is located on the outer side of the joint part indicates a case where the edge is located on the outer side with a distance from the joint part. Herein, the edge of the base sheet member 24 is located on the outer side of the joint part 28. The cover sheet member 26 is located on an outer boundary of the joint part 28. In the present embodiment, the edge of one of the base sheet member 24 and the cover sheet member 26 is located on the outer side of the edge of the other one on the outer side of the joint part 28 described above (the outer side of the base member 20 in a width direction). Herein, the edge of the base sheet member 24 is located on the outer side of the edge of the cover sheet member 26.

The present embodiment describes an example that all the edges on both side parts of the base sheet member 24 are located on the outer side of the joint part 28. The present embodiment describes an example that all the edges on both side parts of the base sheet member 24 are located on the outer side of the edge of the cover sheet member 26. The edge of a part of both side parts of the base sheet member 24 may be located on the boundary of the joint part 28 or located to be overlapped with the joint part 28. The edge of a part of both side parts of the base sheet member 24 may be located on the outer side of the edge of the cover sheet member 26.

The joint part 28 is formed in a part where the side part of the base sheet member 24 and the side part of the cover sheet member 26 are overlapped with each other, thus is formed in a region on an inner side of the edge of the base sheet member 24. As described above, the protruding part 29p occurring by joint processing is formed to protrude outside from the joint part 28. Thus, the protruding part 29p is formed to extend on the side part of the base sheet member 24 from the edge of the cover sheet member 26 toward the edge of the base sheet member 24. The protruding part 29p may protrude further outside from the edge of the base sheet member 24 depending of an amount of protrusion of the protruding part 29p.

In the present embodiment, the base member 20 includes a concave side part 20g where a part of the side part of the base member 20 is concaved more than the other part. Herein, a concave side part 20g is formed in both side parts of the middle portion of the main wire fixing part 21 in the extension direction. The concave side part 20g is provided for a purpose of avoiding contact between the wiring member 10 and a peripheral member 100 in a case where the peripheral member 100 is located in a midway portion of a position where the wiring member 10 is incorporated, for example.

A width W1 of a part where the concave side part 20g is formed in the main wire fixing part 21 is smaller than a width W2 of the other part (a part where the concave side part 20g is not formed) in the base sheet member 24. The side part of the cover sheet member 26 is also concaved in accordance with a dimension in which the side part of the base sheet member 24 is concaved.

Assumed herein is that the side part of the base sheet member 24 and the side part of the cover sheet member 26 are joined in the same condition using the same tool as a tool for joint (refer to the exemplified chip 110 and anvil 112) to effectively join them. In the case, it is considered that a width W3 of a part of the joint part 28 where the concave side part 20g is formed (for example, 3.5 mm) is smaller than a width W4 of the other part (for example, 5 mm). Then, the protruding part 29p protruding outside from the joint part 28 is easily formed in a part where the concave side part 20g is formed. Thus, when applied is the configuration of locating the edge of one of the base sheet member 24 and the cover sheet member 26 on the outer side of the edge of the other one in the part corresponding to the concave side part 20g, the protruding part 29p is hardly visible. Herein, the edge of the base sheet member 24 is located on the outer side of the edge of the cover sheet member 26 in the part corresponding to the concave side part 20g.

According to the wiring member 10 having such a configuration, there is a possibility that the protruding part 29p protruding outside from the joint part 28 occurs by processing for joint. In the present wiring member 10, the edge of at least one of the base sheet member 24 and the cover sheet member 26 is located on the outer side of the joint part 28. Thus, even if the protruding part 29p is formed to protrude from the joint part 28, the protruding part 29p is easily housed and disposed in the edge of at least one of the base sheet member 24 and the cover sheet member 26.

Particularly, in the present wiring member 10, the edge of one of the base sheet member 24 and the cover sheet member 26 is located on the outer side of the edge of the other one. Thus, the joint part 28 is formed on the inner side of the edge of one of the base sheet member 24 and the cover sheet member 26 more reliably. Even if the protruding part 29p protrudes more than the edge of the other one of the base sheet member 24 and the cover sheet member 26, the protruding part 29p is easily housed and disposed in the edge of one of the base sheet member 24 and the cover sheet member 26. Thus, the protruding part 29p caused by processing is hardly visible in the side part of the wiring member 10.

Particularly, when the cover sheet member 26 is provided over the whole base sheet member 24 in the extension direction, the cover sheet member 26 can protect the wire-like transmission member 30 over the whole base sheet member 24 in the extension direction. In such a configuration, the protruding part 29p is hardly visible in the side part of the base member 20.

One of the base sheet member 24 and the cover sheet member 26 having the side part located on the outer side is softer than the other one having the side part located on the inner side. Herein, the side part of the base sheet member 24 is located on the outer side of the side part of the cover sheet member 26. Thus, the base sheet member 24 is softer than the cover sheet member 26. Thus, the side part of the soft base sheet member 24 is located on the outer side of the base member 20 in the width direction. Thus, when an operator holds both side parts of the wiring member 10, for example, a hand of the operator has mainly contact with the soft base sheet member 24. Accordingly, when the wiring member 10 is touched for grasp, for example, the operator can be provided with a soft texture.

When the joint part 28 is formed to have the small width in the part corresponding to the concave side part 20g, the protruding part 29p protruding outside from the joint part 28 easily occurs. When the edge of one of the base sheet member 24 and the cover sheet member 26 is located on the outer side of the edge of the other one in the region corresponding to the concave side part 20g, the protruding part 29p is hardly visible.

Modification Example

The base member 20 and the wire-like transmission member 30 need not have a branch wire part. The base member and the wire-like transmission member may extend to be formed into a linear shape.

It is also applicable that the edge of one of the base sheet member 24 and the cover sheet member 26 is located on the outer side of the edge of the other one in only the part corresponding to the concave side part 20g, and the edge of the base sheet member 24 and the edge of the cover sheet member 26 are located in the same position in the part where the concave side part 20g is not provided.

Figure 5:
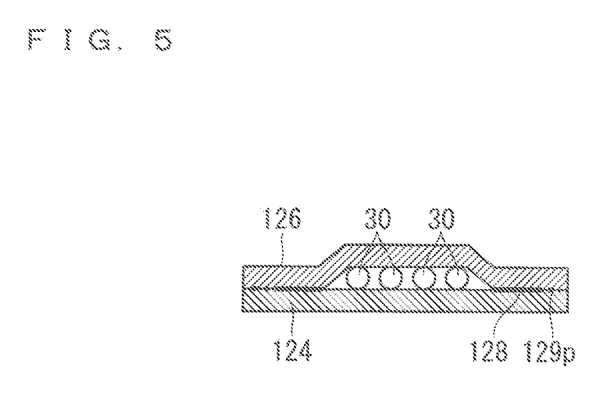
FIG. 5 is a cross-sectional view illustrating a wiring member according to a modification example.

As with the modification example illustrated in FIG. 5, an edge of a base sheet member 124 and an edge of the cover sheet member 126 may be located in the same position. In this case, the edge of the base sheet member 124 and the edge of the cover sheet member 126 may be located on the outer side of a joint part 128. Accordingly, even if a protruding part 129p extending from the joint part 128 is formed, it is expected that the protruding part 129p is housed on the outer side of the joint part 128 between the base sheet member 124 and the cover sheet member 126, and does not protrude outside from the edges thereof.

Figure 6:
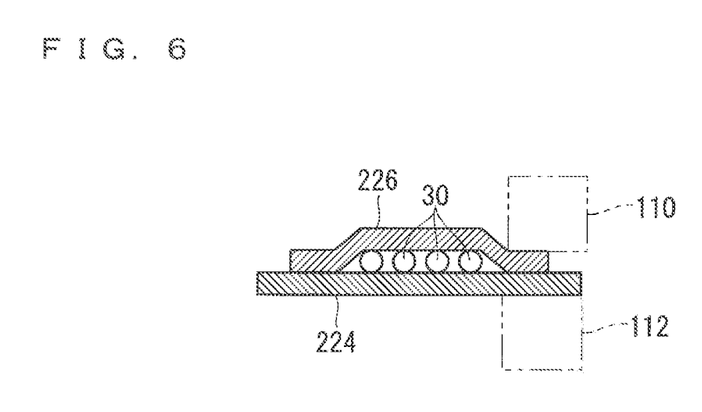
FIG. 6 is a cross-sectional view illustrating a wiring member according to another modification example before joint.
Figure 7:
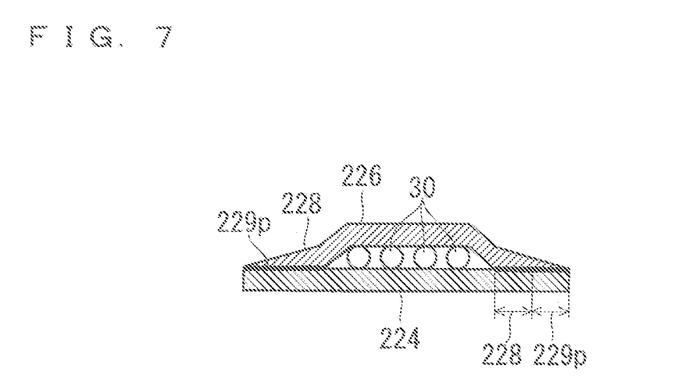
FIG. 7 is a cross-sectional view illustrating a wiring member according to another modification example.

As with modification examples illustrated in FIG. 6 and FIG. 7, there may be a case where a protruding part 229p is joined to at least one of a base sheet member 224 and a cover sheet member 226.

For example, it is assumed that a side part of the base sheet member 224 and a side part of the cover sheet member 226 are pressurized by the chip 110 and the anvil 112 and ultrasonic-welded while the edge of the cover sheet member 226 is located on the inner side of the edge of the base sheet member 224. In this case, the joint part 228 is formed in a part where the base sheet member 224 and the cover sheet member 226 are overlapped with each other before joint. The joint part 228 is an example of a joint part joining the side part of the base sheet member 224 and the side part of the cover sheet member 226.

The joint part 228 in the present modification example joins at least a part of the side part of the base sheet member 224 to the cover sheet member 226 in an initial overlap part of the base sheet member 224 and the cover sheet member 226. Thus, the joint part 228 may be considered an initial overlap joint part 228. The initial overlap part of the base sheet member 224 and the cover sheet member 226 indicates a part where the base sheet member 224 and the cover sheet member 226 are overlapped with each other before joint. The initial overlap joint part 228 is a part where the base sheet member 224 and the cover sheet member 226 are joined in such an initial overlap part.

There may be a case where one of the base sheet member 224 and the cover sheet member 226 are pressed and extend to form the protruding part 229p protruding outside from the initial overlap joint part 228 depending on a pressurization condition and a shape of a pressurization surface of the chip 110 and the anvil 112. There may be a case where the protruding part 229p is ultrasonic-welded to the other one of the base sheet member 224 and the cover sheet member 226 while being housed in the inner side of the edge of the other one of the base sheet member 224 and the cover sheet member 226. The protruding part 229p is also considered an additional joint part. FIG. 7 illustrates an example that the cover sheet member 226 is pressed and extends to form the protruding part 229p protruding outside from the initial overlap joint part 228. FIG. 7 also illustrates an example that the protruding part 229p is ultrasonic-welded to the base sheet member 224 on the inner side of the edge of the base sheet member 224.

In the present modification example, the edge of the base sheet member 224 is located on the outer side of the initial overlap joint part 228, thus even if the protruding part 229p is formed to extend outside from the initial overlap joint part 228, the protruding part 229p is easily housed in the edge of the base sheet member 224. Thus, the protruding part 229p hardly protrudes from the edge located on the outer side in the edge of the base sheet member 224 and the edge of the cover sheet member 226. A joint region of the base sheet member 224 and the cover sheet member 226 can be increased, thus joint strength is increased.

The present embodiment includes a disclosure regarding a manufacturing method of manufacturing a wiring member by joining a region on an inner side with a distance from the edge of at least one of the base sheet member and the cover sheet member. A joint method in this case is not particularly limited, but includes a joint method in which a member is deformed by joint to form the protruding part such as welding (ultrasonic welding or thermal welding), for example.

According to the embodiment and the modification example described above, any configuration is included in a scope of claims as long as a part processed by joint (including a joint part and a protruding part extending after joint) is located in the same position or an inner side of the edge which is one of the edge of the base sheet member and the edge of the cover sheet member located on an outer side. When the edge of the base sheet member and the edge of the cover sheet member deviate inside and outside, a region where the base sheet member and the cover sheet member are overlapped with each other is necessarily located on the inner side of the edge which is one of the edge of the base sheet member and the edge of the cover sheet member located on the outer side. Accordingly, in this case, even if the joint part is formed in any region where the base sheet member and the cover sheet member are overlapped with each other, the protruding part may be housed in the edge on the outer side.

Also included in a scope of claims is a case where a joint region is disposed an inner side of the edge of the base sheet member and the edge of the cover sheet member so that a protruding part does not occur from the edges thereof in a case where the edges thereof are located in the same position. For example, in the case where the edge of the base sheet member and the edge of the cover sheet member are located in the same position, when they are ultrasonic-welded, a position of ultrasonic welding (a position provided with ultrasonic vibrations) is considered a joint part. The position of ultrasonic welding can be found by a trace thereof. For example, a position where a total thickness of the base sheet member and the cover sheet member is small may be considered a joint part.

The joint part may be disposed on the inner side to an extent that a protruding part does not occur from the edge which is one of the edge of the base sheet member and the edge of the cover sheet member located on the outer side. For example, applicable is a configuration that the joint part is disposed in the inner side to the extent that the protruding part does not occur from the edge of the base sheet member and the edge of the cover sheet before joint, and the protruding part is housed in the inner side of the edge of the base sheet member and the edge of the cover sheet member after joint.

Each configuration described in the embodiment and each modification example can be appropriately combined as long as they are not contradictory. The modification examples illustrated in FIG. 5, FIG. 6, and FIG. 7 may be applied to a region corresponding to the concave side part 20g as described in the embodiments described above.

EXPLANATION OF REFERENCE SIGNS 10 wiring member
20 base member
20g concave side part
21 main wire fixing part
22 branch wire fixing part
24 base sheet member
26 cover sheet member
28 joint part
29p protruding part
30 wire-like transmission member
31 main wire part
32 branch wire part
48 connector
100 peripheral member
110 chip
112 anvil
124 base sheet member
126 cover sheet member
128 joint part
129p protruding part
224 base sheet member
226 cover sheet member
22 initial overlap joint part (joint part)
229p protruding part

The invention claimed is:

1. A wiring member, comprising:
a base member including a base sheet member and a cover sheet member; and
a wire-like transmission member fixed to the base member, wherein
the cover sheet member is overlapped with the base sheet member while covering the wire-like transmission member,
a side part of the base sheet member and a side part of the cover sheet member are joined via a joint part,
an edge of at least one of the base sheet member and the cover sheet member is located on an outer side of the joint part,
the edge of one of the base sheet member and the cover sheet member is located on an outer side of the edge of another one of the base sheet member and the cover sheet member, and
the one of the base sheet member and the cover sheet member is softer than the another one of the base sheet member and the cover sheet member.

2. The wiring member according to claim 1, wherein
the cover sheet member is overlapped with the base sheet member over a whole of the base sheet member in an extension direction.

3. The wiring member according to claim 1, wherein
a protruding part occurring by joint processing is formed to extend outside from the joint part.

4. The wiring member according to claim 3, wherein
the protruding part is joined to at least one of the base sheet member and the cover sheet member.

5. The wiring member according to claim 1, wherein
the base sheet member is larger and softer than the cover sheet member.

6. A wiring member comprising:
a base member including a base sheet member and a cover sheet member, and
a wire-like transmission member fixed to the base member, wherein
the cover sheet member is overlapped with the base sheet member while covering the wire-like transmission member,
a side part of the base sheet member and a side part of the cover sheet member are joined via a joint part, and
an edge of at least one of the base sheet member and the cover sheet member is located on an outer side of the joint part,
the base member includes a concave side part concaved more than another part in a part of the side part,
the joint part is formed to have a smaller width than another part in a part corresponding to the concave side part, and
the edge of at least one of the base sheet member and the cover sheet member is located on an outer side of the joint part in the part corresponding to the concave side part.

7. The wiring member according to claim 6, wherein the edge of one of the base sheet member and the cover sheet member is located on an outer side of the edge of another one of the base sheet member and the cover sheet member.

8. The wiring member according to claim 7, wherein the one of the base sheet member and the cover sheet member is softer than the another one of the base sheet member and the cover sheet member.

9. A wiring member, comprising:
a base member including a base sheet member and a cover sheet member; and
a wire-like transmission member fixed to the base member, wherein
the cover sheet member is overlapped with the base sheet member while covering the wire-like transmission member,
a side part of the base sheet member and a side part of the cover sheet member are joined via an initial overlap joint part,
a protruding part protruding from the initial overlap joint part toward outside is formed on one of the base sheet member and the cover sheet member, and
the protruding part is joined to another one of the base sheet member and the cover sheet member in an inner side of an edge of the another one of the base sheet member and the cover sheet member, and
the wire-like transmission member is fixed to the base member by melting joint so as to be kept in a form following a fixed wiring route.

* * * * *